United States Patent [19]

Peters et al.

[11] Patent Number: 4,757,233
[45] Date of Patent: Jul. 12, 1988

[54] EFFICIENT UV-EMITTING PHOSPHORS BASED ON CERIUM-ACTIVATED CALCIUM PYROPHOSPHATE AND LAMPS CONTAINING THE SAME

[75] Inventors: Thomas E. Peters, Chelmsford; Romano G. Pappalardo, Sudbury; Alexandre Vetrovs, Walpole, all of Mass.

[73] Assignee: GTE Laboratories Inc., Waltham, Mass.

[21] Appl. No.: 684,474

[22] Filed: Dec. 21, 1984

[51] Int. Cl.$^4$ ............................................. C09K 11/471
[52] U.S. Cl. .............................. 313/486; 252/301.4 P
[58] Field of Search ................ 252/301.4 P; 313/486

[56] References Cited

U.S. PATENT DOCUMENTS

| | | | |
|---|---|---|---|
| 2,306,567 | 12/1942 | Roberts | 252/301.4 P |
| 3,963,639 | 6/1975 | Klem | 313/485 |
| 4,070,583 | 1/1978 | Rabatin | 250/483 |
| 4,079,288 | 3/1978 | Maloney et al. | 313/489 |
| 4,088,922 | 5/1978 | Wolfe | 313/486 |
| 4,153,572 | 5/1979 | Wolfe | 252/301 |
| 4,189,661 | 2/1980 | Haugsjaa | 315/39 |
| 4,199,708 | 4/1980 | Lauwerijssen et al. | 313/493 |
| 4,224,553 | 9/1980 | Hellwig | 313/489 |

FOREIGN PATENT DOCUMENTS

| | | | |
|---|---|---|---|
| 93399 | 11/1983 | European Pat. Off. | 252/301.4 P |
| 806191 | 12/1958 | United Kingdom | 252/301.4 P |
| 1565811 | 4/1980 | United Kingdom | . |

OTHER PUBLICATIONS

Thompson, Journal Electrical Soc., vol. 104, No. 10.

*Primary Examiner*—Jack Cooper
*Attorney, Agent, or Firm*—Ernest V. Linek

[57] ABSTRACT

The present invention is directed to phosphors exhibiting efficient, narrow band UV emission, with peak emission at 330 nm (from excitation at 254). These phosphors are cerium-activated calcium pyrophosphate (beta-phase) of nominal formulation $$Ca_{(2-w-x-y)}(NSF)_w Ce_x Na_y P_2 O_7$$

wherein:
NSF is the non-stoicheometric factor;
$0 \leq w \leq 0.1$;
$0.05 \leq x \leq 0.20$; and
$0.05 \leq y \leq 0.20$.

15 Claims, 2 Drawing Sheets

EFFICIENT UV-EMITTING PHOSPHORS BASED ON CERIUM-ACTIVATED CALCIUM PYROPHOSPHATE AND LAMPS CONTAINING THE SAME

BACKGROUND OF THE INVENTION

The present invention is directed to luminescent materials, to methods of making such materials, and to methods of using such materials. More particularly, the present invention is directed to efficient narrow band ultra-violet (UV) emitting phosphors, especially useful for erythemal applications and as "black-lights".

Ultra-violet emitting phosphors are known in the art. See for example, U.S. Pat. Nos. 4,189,661 to Haugsjaa et al., 4,153,572 and 4,088,922 to Wolfe, 4,070,583 to Rabatin, 4,224,553 to Hellwig, and GB Pat. No. 1,565,811.

One such UV emitting phosphor is the GTE Sylvania Type 2011, which has the chemical formula $BaSi_2O_5:Pb$, and is available from the Chemical and Metallurgical Division, GTE Precision Materials Group, Towanda, PA 18848.

The present invention represents an alternative to the above-described phosphors having advantages over previous UV-emitting phosphors including; (1) a fluorescence in the UV spectral region at 330 nm, whose intensity under 254 nm, excitation exceeds that of the Ba silicate: Pb phosphor by as much as 18%. (2) a more favorable absorption than the Ba-silicate: Pb phosphor which permits it to also convert the 297 nm and 313 nm UV lines emitted by the Hg plasma into 330 nm emission. (3) An intense UV emission peaking at the wavelength location which should permit efficient sensitization of visible and near impared emissions from trivalent rare-earth cons, such as $Tb^{3+}$, $Dy^{3+}$, $Tm^{3+}$ and $Eu^{3+}$, and also for sensitization of the technologically important emission from $Mn^{2+}$.

SUMMARY OF THE INVENTION

The present invention is directed to phosphors exhibiting efficient, narrow band UV emission, with peak emission at 330 nm (from excitation at 254). These phosphors are cerium-activated calcium pyrophosphate (beta-phase) of nominal formula $$Ca_{(2-w-x-y)}(NSF)_wCe_xNa_yP_2O_7$$

wherein:
NSF is the non-stoichiometric factor;
$0 \leq w \leq 0.1$;
$0.05 \leq x \leq 0.20$; and
$0.05 \leq y \leq 0.20$.

DETAILED DESCRIPTION OF THE PREFERRED EMBODIMENTS

Figure 1:
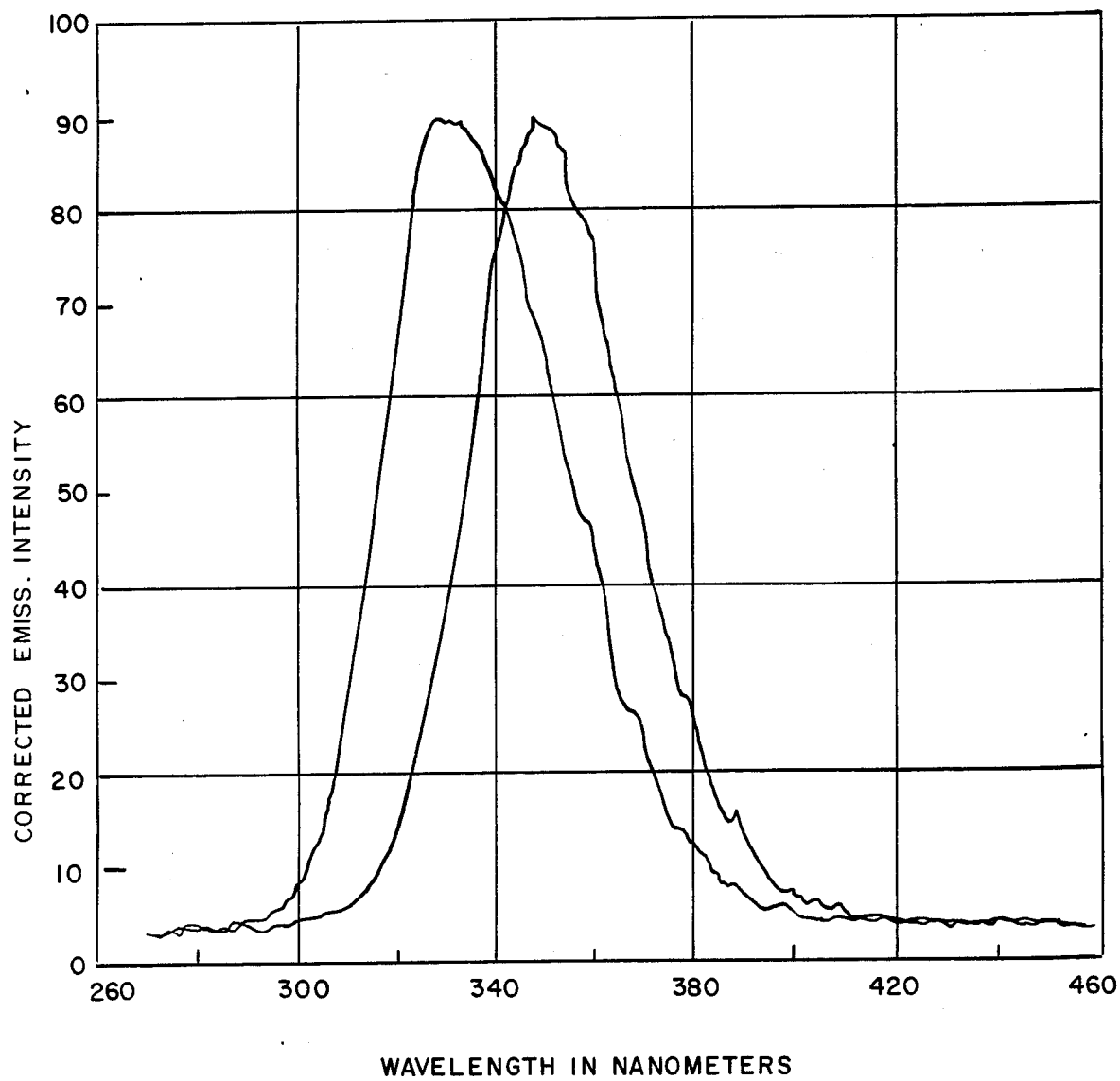
FIG. 1 is a corrected emission spectrum for a typical cerium-activated calcium pyrophosphate phosphor, prepared in accordance with the method of the present invention (see Example 1) compared with the corresponding emission spectrum of a commercially available long wave-length UV-emitting phosphor, Sylvania Type 2011.

The emission spectrum for 254 nm excitation is plotted in FIG. 1, and is contrasted with the emission spectrum of a commercial UV-emitting phosphor, GTE Sylvania, Type 2011. It is evident from the emission spectra that on excitation at 254 nm (the wavelength of importance in low-pressure fluorescent lamps) the emission intensity of the cerium-activated pyrophosphate phosphors of the present invention approach that of the commercial material.

Figure 2:
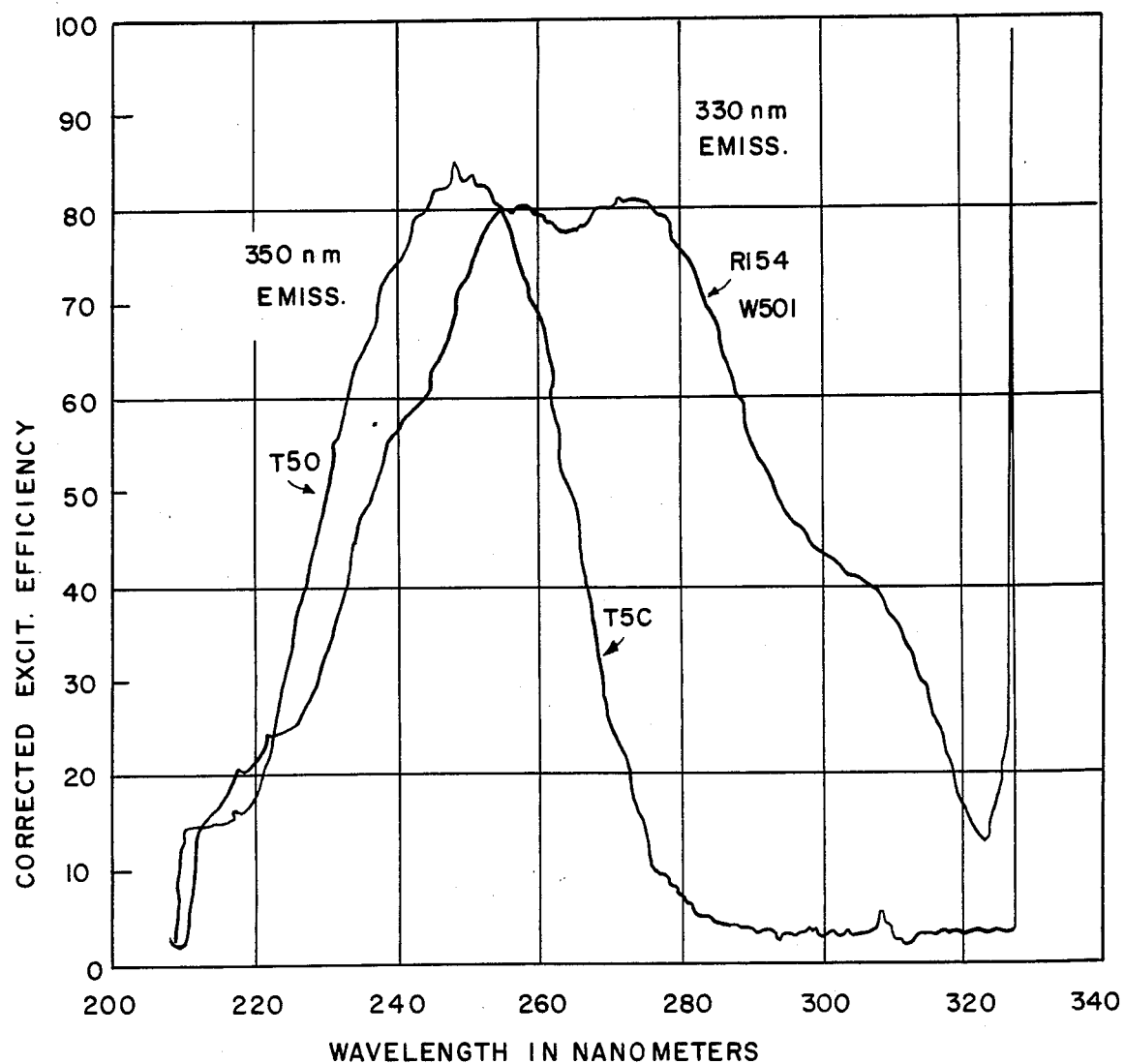
FIG. 2 is the excitation spectra of the phosphor of example 1 and the Type 2011 phosphor, measured for emission at the peak of the respective bands, showing the different spectral regions of emission-generating absorption for the two materials.

The excitation spectra of FIG. 2, measured for emission at the peak of the respective bands, detail the different spectral regions of emission-generating absorption for the two materials. Although the excitation spectra cross around 254 nm, in accordance with the comparable peak height of the emission bands for the two phosphors (see FIG. 1), the excitation region for the cerium-activated material covers a wider portion of the UV spectrum, to the long-wavelength side of 254 nm. As a result, the cerium-activated calcium pyrophosphate material of the present invention is capable of absorbing, and converting into 330 nm emission, both the 297 nm and 313 nm UV lines emitted by a Hg plasma, which are not appreciably absorbed by the commercial phosphor.

The efficient conversion by the phosphors of the present invention of 254 nm radiation into UV-emission by cerium, has important implications for the use of such an intense Ce emission for the purpose of sensitization of visible and near infrared emission from trivalent rare-earth ions, such as $Tb^{3+}$, $Dy^{3+}$, $Tm^{3+}$, and $Eu^{3+}$, and also for the sensitization of the technologically important emission from $Mn^{2+}$.

Two types of firing atmosphere were tested in the synthesis of the present phosphor materials; a 'CO atmosphere' (described infra) in Example 1 and a mixture of nitrogen and hydrogen 'forming gas'. Although both methods yield efficient UV emitting materials, those resulting from the 'forming gas' firing were judged preferable on the basis of having a more intense 330 nm emission under similar (254 nm) excitation conditions.

All of the chemical raw materials employed in phosphor preparation were of Luminescent or Reagent grade purity. A powder blend was created by milling together the desired quantities of these raw materials. The composition of the various powder blends, together with the processing steps required for phosphor preparation are given in the example.

EXAMPLE 1

| Reagent | Mole Ratio | Weight (grams) |
|---|---|---|
| $CaHPO_4$ | 1.74 | 37.88 |
| $CeO_2$ | 0.10 | 2.75 |
| $Na_2CO_3$ | 0.05 | 0.85 |
| $(NH_4)_2HPO_4$ | 0.26 | 5.49 |

After a thoroughly mixed power blend had been achieved it was placed in an alumina crucible. The crucible containing the powder blend was then inserted into a larger crucible and the intervening space between the two crucibles was filled with charcoal granules. Covers were placed on both crucibles and they were placed in a furnace and heated to 1000° C. and held at temperature for a period of 1.0 hour. At the end of the firing period the double crucibles were removed from the furnace and were allowed to cool to room temperature before their covers were removed.

The resulting white bodied phosphor of nominal formula

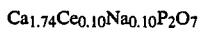
$Ca_{1.74}Ce_{0.10}Na_{0.10}P_2O_7$ is isostructural with the low temperature (beta) polymorph of $Ca_2P_2O_7$. It has a violet emission when excited by 254 nm radiation, with a peak intensity at 330 nm of 110% relative to that of the $BaSi_2O_5$:Pb reference material.

EXAMPLE 2

| Ingredient | Mole Ratio | Weight (gms) |
|---|---|---|
| CaHPO$_4$ | 1.78 | 19.37 |
| Na$_2$CO$_3$ | 0.04 | 0.34 |
| CeO$_2$ | 0.08 | 1.10 |
| (NH$_4$)HPO$_4$ | 0.22 | 2.32 |

The powder blend was placed in an alumina tray and fired at 1000° C. for a period of 1.0 hour in an atmosphere consisting of 95% (vol) Nitrogen and 5% (vol) Hydrogen (forming gas). After the prescribed firing period had elapsed, the powder was permitted to furnace cool to ≃400° C. in the forming gas atmosphere.

The resulting white bodied phosphor of nominal formula

$Ca_{1.78}Ce_{0.08}Na_{0.08}P_2O_7$ is isostructural with the low temperature (beta) polymorph of $Ca_2P_2O_7$. It has a violet emission when excited by 254 nm radiation, with a peak intensity at 330 nm of 110% relative to that of the $BaSi_2O_5$:Pb reference material.

EXAMPLE 3

| Ingredient | Mole Ratio | Weight (gms) |
|---|---|---|
| CaHPO$_4$ | 1.74 | 18.94 |
| Na$_2$CO$_3$ | 0.05 | 0.42 |
| CeO$_2$ | 0.10 | 1.38 |
| (NH$_4$)$_2$HPO$_4$ | 0.26 | 2.75 |

The powder blend was placed in an alumina tray and fired under identical conditions to those described in Example 2 above. The resulting white bodies phosphor of nominal formula

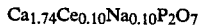
$Ca_{1.74}Ce_{0.10}Na_{0.10}P_2O_7$ is isostructural with the low temperature (beta) polymorph of $Ca_2P_2O_7$. It has a violet emission when excited by 254 nm radiation, with a peak intensity at 330 nm of 115% relative to that of the $BaSi_2O_5$:Pb reference material.

EXAMPLE 4

| Ingredient | Mole Ratio | Weight (gms) |
|---|---|---|
| CaHPO$_4$ | 1.70 | 18.50 |
| Na$_2$CO$_3$ | 0.06 | 0.51 |
| CeO$_2$ | 0.12 | 1.65 |
| (NH$_4$)$_2$HPO$_4$ | 0.30 | 3.17 |

The powder blend was placed in an alumina tray and fired under identical conditions to those described in Example 2 above. The resulting white bodied phosphor of nominal formula

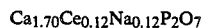
$Ca_{1.70}Ce_{0.12}Na_{0.12}P_2O_7$ is isostructural with the low temperature (beta) polymorph of $Ca_2P_2O_7$. It has a violet emission when excited by 254 nm radiation, with a peak intensity at 330 nm of 118% relative to that of the $BaSi_2O_5$:Pb reference material.

EXAMPLE 5

| Ingredient | Mole Ratio | Weight (gms) |
|---|---|---|
| CaHPO | 1.66 | 18.07 |
| Na$_2$CO$_3$ | 0.07 | 0.59 |
| CeO$_2$ | 0.14 | 1.93 |
| (NH$_4$)$_2$HPO$_4$ | 0.34 | 3.59 |

The powder blend was placed in an alumina tray and fired under identical conditions to those described in Example 2 above. The resulting white bodies phosphor of nominal formula

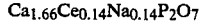
$Ca_{1.66}Ce_{0.14}Na_{0.14}P_2O_7$ is isostructural with the low temperature (beta) polymorph of $Ca_2P_2O_7$. It has a violet emission when excited by 254 nm radiation, with a peak intensity of 330 nm of 112% relative to that of the $BaSi_2O_5$:Pb reference material.

EXAMPLE 6

| Ingredient | Mole Ratio | Weight (gms) |
|---|---|---|
| CaHPO$_4$ | 1.62 | 17.63 |
| Na$_2$CO$_3$ | 0.08 | 0.68 |
| CeO$_2$ | 0.16 | 2.20 |
| (NH$_4$)$_2$HPO$_4$ | 0.38 | 4.01 |

The powder blend was placed in an alumina tray and fired under identical conditions to those described in Example 2 above. The resulting white bodied phosphor of nominal formula

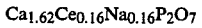
$Ca_{1.62}Ce_{0.16}Na_{0.16}P_2O_7$ is isostructural with the low temperature (beta) polymorph of $Ca_2P_2O_7$. It has a violet emission when excited by 254 nm radiation, with a peak intensity at 330 nm of 116% relative to that of the $BaSi_2O_5$:Pb reference material.

Figure 3:
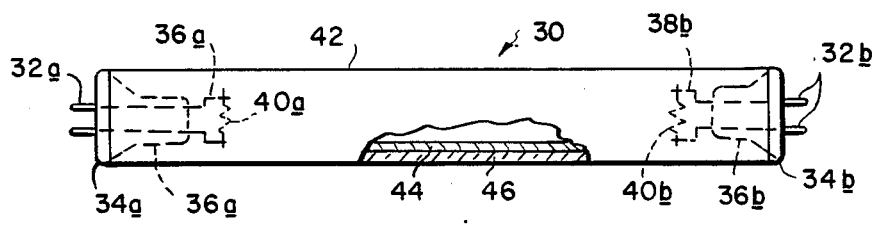
FIG. 3 is a lateral view, partially cut-away, of a UV lamp utilizing a phosphor of the present invention.

A second aspect of the present invention is illustrated in FIG. 3. An ultra-violet lamp 30 comprises a transparent, light-transmitting sealed envelope 42, prepared from quartz, or preferably, glass. The envelope 42 is fitted at each end with mounts comprising electrodes 40a and 40b, re-entrant stem presses 36a and 36b, and lead-in conductors 38a and 38b. Base caps 34a and 34b and pins 32a and 32b are provided at each end of the envelope, together with a small charge of mercury 44 within the envelope 42. The inner surface of envelope 42 is coated with a phosphor layer of the present invention 46.

The present invention has been described in detail, including the preferred embodiments thereof. However, it will be appreciated that those skilled in the art, upon consideration of the present disclosure, may make modifications and improvements on the invention and still be within the scope and spirit of this invention as set forth in the following claims.

What is claimed is:

1. Efficient narrow band ultra-violet emitting phosphors consisting essentially of cerium activated calcium pyrophosphate beta-phase matrices having the general formula:

$$Ca_{(2-w-x-y)}(NSF)_w Ce_x Na_y P_2 O_7$$

wherein:
NSF is the non-stoicheometric factor;
$0 \leq w \leq 0.1$;
$0.05 \leq x \leq 0.20$; and
$0.05 \leq y \leq 0.20$;
said phosphors being characterized by a peak emission at about 330 nm when excited by short wave ultra violet light of 254 nm.

2. The phosphors of claim 1, wherein w is from 0 to 0.06.

3. The phosphors of claim 1, wherein x is from 0.08 to 0.16.

4. The phosphors of claim 1, wherein y is from 0.08 to 0.16.

5. The phosphor of claim 1, having the formula:

$$Ca_{1.74}Ce_{0.10}Na_{0.10}P_2O_7.$$

6. The phosphor of claim 1, having the formula:

$$Ca_{1.78}Ce_{0.08}Na_{0.08}P_2O_7.$$

7. The phosphor of claim 1, having the formula:

$$Ca_{1.70}Ce_{0.12}Na_{0.12}P_2O_7.$$

8. The phosphor of claim 1, having the formula:

$$Ca_{1.66}Ce_{0.14}Na_{0.14}P_2O_7.$$

9. The phosphor of claim 1, having the formula:

$$Ca_{1.62}Ce_{0.16}Na_{0.16}P_2O_7.$$

10. An ultra-violet lamp comprising:
(a) a sealed tubular envelope;
(b) a discharge-sustaining filling including mercury contained within said envelope;
(c) electrodes disposed within said envelope and operable when energized to sustain a discharge therebetween to generate ultra-violet radiation of about 330 nm; and
(d) a phosphor coating disposed on the interior surface of said envelope, said phosphor coating having the nominal formula $$Ca_{(2-w-x-y)}(NSF)_w Ce_x Na_y P_2 O_7$$

wherein:
NSF is the non-stoicheometric factor;
$0 \leq w \leq 0.1$;
$0.05 \leq x \leq 0.20$; and
$0.05 \leq y \leq 0.20$.

11. The lamp of claim 10, wherein the phosphor has the formula:

$$Ca_{1.74}Ce_{0.10}Na_{0.10}P_2O_7.$$

12. The lamp of claim 10, wherein the phosphor has the formula:

$$Ca_{1.78}Ce_{0.08}Na_{0.08}P_2O_7.$$

13. The lamp of claim 10, wherein the phosphor has the formula:

$$Ca_{1.70}Ce_{0.12}Na_{0.12}P_2O_7.$$

14. The lamp of claim 10, wherein the phosphor has the formula:

$$Ca_{1.66}Ce_{0.14}Na_{0.14}P_2O_7.$$

15. The lamp of claim 10, wherein the phosphor has the formula:

$$Ca_{1.62}Ce_{0.16}Na_{0.16}P_2O_7.$$

* * * * *